United States Patent [19]

Wohlford et al.

[11] Patent Number: 4,645,273
[45] Date of Patent: Feb. 24, 1987

[54] ENDLESS TRACK FLEXOR HAVING CORD REINFORCED TENSILE LOAD-CARRYING PLATE

[75] Inventors: William P. Wohlford, Bettendorf; LaVern B. Hovenga, Davenport, both of Iowa

[73] Assignee: Deere & Company, Moline, Ill.

[21] Appl. No.: 773,495

[22] Filed: Sep. 9, 1985

[51] Int. Cl.⁴ .................. B62D 55/24; B62D 55/28
[52] U.S. Cl. ........................ 305/40; 305/43; 428/222; 74/579 R; 16/225; 474/207
[58] Field of Search ............ 474/202, 206, 207, 232, 474/233; 198/850, 847; 16/225, DIG. 13; 305/35 R, 38, 40–43, 51; 428/222, 377; 156/172; 74/579 R, 581; 416/134 A, 237

[56] References Cited

U.S. PATENT DOCUMENTS

| 1,774,815 | 9/1930 | Robertson | 305/43 |
| 2,667,789 | 2/1954 | Ludwig et al. | 198/847 |
| 2,748,044 | 5/1956 | Seiler | 198/847 |
| 4,451,097 | 5/1984 | Wohlford | 305/40 |

FOREIGN PATENT DOCUMENTS 721141 12/1954 United Kingdom ................. 305/41

Primary Examiner—David A. Scherbel

[57] ABSTRACT

A flexor for an endless track includes a tensile load-carrying core encapsulated in an elastomeric case and being in the form of a single plate wrapped lengthwise by a core having a tensile pre-load.

2 Claims, 2 Drawing Figures

ENDLESS TRACK FLEXOR HAVING CORD REINFORCED TENSILE LOAD-CARRYING PLATE

BACKGROUND OF THE INVENTION

The present invention relates to endless track for track-laying vehicles and more particularly relates to flexors employed in such track for interconnecting and providing flexure between adjacent track link sections.

It is known in the art to construct a flexor so as to have a tensile load-carrying core formed from a stack of thin metal plates and to encase this stack of plates in a protective elastomeric coating. The use of a stack of thin plates instead of a single plate was occasioned by the fact that a single plate made flexible enough to undergo resilient bending, as when passing around a drive sprocket driving the track embodying the flexor, would not have the requisite cross section to carry the desired tensile load when in a bent state. U.S. Pat. No. 4,451,097 granted to Wohlford on May 29, 1984 illustrates a flexor having multiple plates. This usage of multiple plates results in a relatively complex and expensive structure.

SUMMARY OF THE INVENTION

According to the present invention there is provided a novel flexor design.

A broad object of the invention is to provide a flexor design which is less complex and expensive than known prior art structures.

A more specific object is to provide a flexor design having a tensile load-carrying core formed from a single plate having a continuous cord reinforcement wound lengthwise thereabout.

These and other objects, features and advantages of the present invention will become apparent to those skilled in the art from the description which follows and from the drawing.

DESCRIPTION OF THE PREFERRED EMBODIMENT

Figure 1:
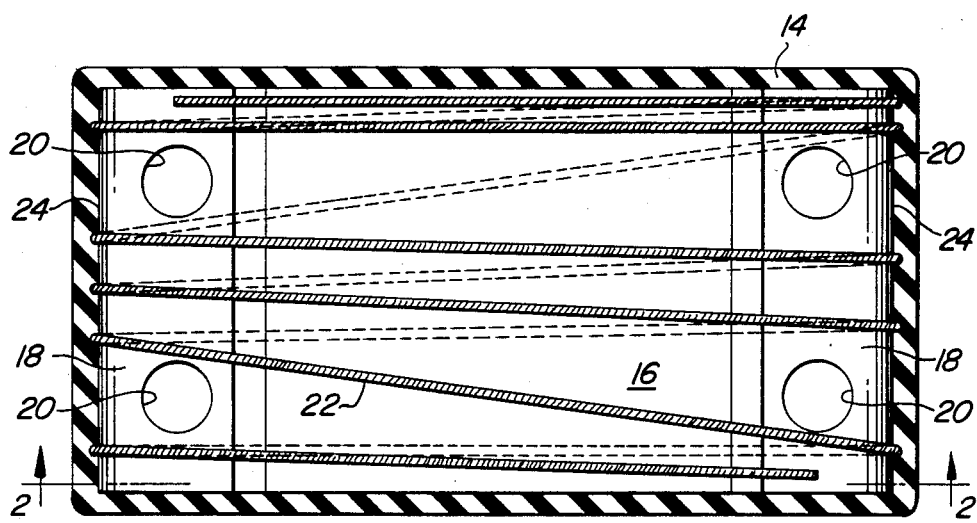
FIG. 1 is a top plan view of a flexor constructed in accordance with the present invention but with the top half of the elastomeric casing removed so as to expose the tensile load-carrying core.
Figure 2:
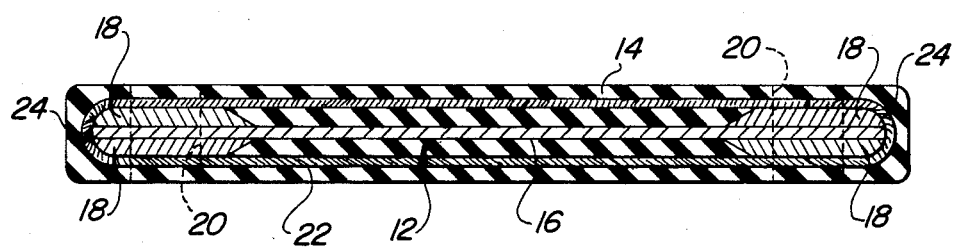
FIG. 2 is a vertical sectional view taken along line 2—2 of FIG. 1.

Referring to the drawing, there is shown a flexor 10 of the type employed in track link sections of endless track for track-laying vehicles for providing flexure between and for transmitting tensile forces between adjacent link sections.

Specifically, the flexor 10 includes a tensile load-carrying core 12 encapsulated in an elastomeric casing 14. The core 12 includes a single plate 16 of metal or any other material having the requisite flexibility and load-carrying characteristics. The plate 16 has a pair of reinforcements 18 adhered in sandwiching relationship to the opposite ends thereof and pairs of mounting holes 20 provided in the opposite ends of the flexor 10 pass through the plate 16 and reinforcements 18. The opposite ends of the plate and reinforcements are each formed with a smooth arcuate surface 24. Wrapped lengthwise about the plate 16 and reinforcements 18 is a cord 22 which may be of material such as that used in automobile tire construction, for example. The windings of the cord 22 are applied under tension such that the wound plate will have a net longitudinal compressive load. The cord 22 is encapsulated in the elastomeric casing 14 while still under tension.

During operation, with the flexor disposed flat and loaded in tension by forces applied at the mounting holes 20, the plate 16 does not come under any load until the compressive pre-load is first overcome.

During operation, with the flexor disposed flat and loaded in tension by forces applied at the mounting holes 20, the plate 16 does not come under any load until the compressive pre-load is first overcome. Thus, it will be appreciated that the tensile load-carrying capacity of the flexor is that of the plate 16 plus the amount of compressive pre-load, the latter being variable in accordance with the number of cord windings and cord tension. When the flexor bends, as when it passes around the track drive sprocket, for example, the cord windings shift the pretension loads thereof from one side of the plate to the other and reduce the range of elastic strain which the plate must undergo in the normal working cycle.

It will be appreciated then that a flexor embodying a single plate may be constructed to have the same load-carrying capacity as a flexor embodying multiple plates through the simple expedient of cord windings applied under tension to the single plate.

We claim:

1. In a flexor including a tensile load-carrying core encapsulated in an elastomeric casing, the improvement comprising: said core being in the form of a single rectangular plate wrapped lengthwise by a cord having a tensile pre-load.

2. The flexor defined in claim 1 wherein opposite end portions of the plate each have a pair of reinforcements applied in sandwiching relationship thereto; and opposite ends of the plate and reinforcements each defining a smooth radius surface engaged by said cord.

* * * * *